United States Patent
Liao et al.

(10) Patent No.: US 8,711,075 B2
(45) Date of Patent: Apr. 29, 2014

(54) LIQUID CRYSTAL DISPLAY WHEREIN THE DATA LINES COVERED BY EACH PIXEL ELECTRODE ARE SUPPLIED WITH DATA SIGNALS OF OPPOSITE POLARITIES

(75) Inventors: Pei-Chun Liao, Hsinchu (TW); Hung-Lung Hou, Hsinchu (TW); Ting-Wei Su, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 1073 days.

(21) Appl. No.: 12/252,496

(22) Filed: Oct. 16, 2008

(65) Prior Publication Data

US 2009/0141010 A1   Jun. 4, 2009

(30) Foreign Application Priority Data

Nov. 29, 2007   (TW) .............................. 96145344 A

(51) Int. Cl.
*G09G 3/36* (2006.01)
*G09G 5/02* (2006.01)
*G02F 1/1343* (2006.01)

(52) U.S. Cl.
USPC .............................. 345/96; 345/695; 349/144

(58) Field of Classification Search
CPC .................... G02F 1/136213; G02F 1/136227; G02F 2201/40; G02F 1/136286; G02F 2001/134345; G09G 2300/0465; G09G 3/2074; G09G 2300/0443
USPC ............. 345/205, 208–209, 695–695, 94, 96; 349/143, 144, 146, 147
See application file for complete search history.

(56) References Cited

U.S. PATENT DOCUMENTS

| | | | |
|---|---|---|---|
| 6,781,658 B1* | 8/2004 | Choi | 349/139 |
| 2001/0002857 A1* | 6/2001 | Shimada et al. | 349/138 |
| 2002/0003588 A1* | 1/2002 | Okada et al. | 349/42 |
| 2004/0046901 A1* | 3/2004 | Matsuoka et al. | 349/43 |
| 2004/0085272 A1* | 5/2004 | Ting et al. | 345/87 |
| 2005/0046764 A1* | 3/2005 | Enda et al. | 349/43 |
| 2005/0140903 A1* | 6/2005 | Park et al. | 349/141 |

(Continued)

FOREIGN PATENT DOCUMENTS

| | | |
|---|---|---|
| KR | 2003-0008044 | 1/2003 |
| TW | 200419266 | 10/2004 |
| TW | 200528816 | 9/2005 |

OTHER PUBLICATIONS

Taiwanese language office action dated Dec. 27, 2011.

(Continued)

*Primary Examiner* — Chanh Nguyen
*Assistant Examiner* — Navin Lingaraju
(74) *Attorney, Agent, or Firm* — McClure, Qualey & Rodack, LLP

(57) ABSTRACT

A liquid crystal display includes first and second pixel electrodes, first to fourth data lines, and a first gate line. The first pixel electrode has separated first primary and secondary sub-pixel electrodes. The second pixel electrode has separated second primary and secondary sub-pixel electrodes. The first data line is coupled to the first secondary sub-pixel electrode and covered by the first pixel electrode. The second data line is coupled to the first primary sub-pixel electrode and covered by the second pixel electrode. The third data line is coupled to the second primary sub-pixel electrode and covered by the second pixel electrode. The fourth data line is coupled to the second secondary sub-pixel electrode. The first gate line is coupled to the first pixel electrode and the second pixel electrode.

15 Claims, 9 Drawing Sheets

(56) References Cited

U.S. PATENT DOCUMENTS

| | | | |
|---|---|---|---|
| 2005/0219450 A1* | 10/2005 | Tanaka et al. | 349/139 |
| 2006/0164352 A1* | 7/2006 | Yoo et al. | 345/87 |
| 2007/0268229 A1* | 11/2007 | Kang et al. | 345/100 |
| 2007/0291192 A1* | 12/2007 | Kim et al. | 349/42 |
| 2008/0018573 A1* | 1/2008 | Hsieh et al. | 345/87 |
| 2008/0036933 A1* | 2/2008 | Na et al. | 349/38 |
| 2008/0068524 A1* | 3/2008 | Kim | 349/38 |
| 2008/0158464 A1* | 7/2008 | Chang et al. | 349/48 |
| 2008/0204613 A1* | 8/2008 | Kim et al. | 349/33 |
| 2008/0210940 A1* | 9/2008 | Lee et al. | 257/59 |
| 2008/0225218 A1* | 9/2008 | Lee et al. | 349/144 |
| 2009/0244424 A1* | 10/2009 | Kim et al. | 349/48 |

OTHER PUBLICATIONS

English language translation of abstract of TW 200528816.

English language translation of abstract of TW 200419266.

English language translation of abstract of KR 2003-0008044 (published Jan. 24, 2003).

* cited by examiner

LIQUID CRYSTAL DISPLAY WHEREIN THE DATA LINES COVERED BY EACH PIXEL ELECTRODE ARE SUPPLIED WITH DATA SIGNALS OF OPPOSITE POLARITIES

This application claims the benefit of Taiwan application Serial No. 96145344 filed on Nov. 29, 2007, the subject matter of which is incorporated herein by reference.

BACKGROUND OF THE INVENTION

1. Field of the Invention

The invention relates to a liquid crystal display (LCD) panel, and more particularly to a method for manufacturing a wide visual angle LCD panel by multi-domain vertical alignment (MVA).

2. Description of the Related Art

Liquid crystal display (LCD) panels have many advantages, such as small volume, light weight, low power consumption and so on. Thus, LCD panels are popularly applied in electronic products, such as portable computers and mobile phones, instead of conventional cathode ray tubes (CRTs). However, current LCD panels have undesired narrow visual angles. Many methods for improving visual angles of LCD panels have been provided. For example, for a multi-domain vertical alignment (MVA) method known in the art, a pixel electrode is divided into two sub-pixel electrodes. When an LCD panel displays low gray level images, two data signals with different voltage levels are respectively provided to the sub-pixel electrodes via data lines.

FIG. 1 is a schematic diagram of a conventional LCD panel and peripheral driving circuits. As shown in FIG. 1, the LCD panel 1 is formed by interlaced data lines d11, d12, d21, d22 ... dm1, dm2 and gate lines g1, g2 ... gm. Each interlaced set includes two data lines and one gate line and is used to control a display unit, for example, the data lines d11 and d12 and the data line g1 are used to control a display unit mainly formed by a pixel electrode 30. As shown in FIG. 1, the equivalent circuit of the display unit comprises a pixel electrode (such as 30, 40, 50), thin film transistors q111-q1$m$2, q211-q2$m$2 ... qn11-qnm2 for controlling data input, and storage capacitors c111-c1$m$2, c211-c2$m$2 ... cn11-cnm2. Gate electrodes and drain electrodes of the thin film transistors are coupled to the gate lines g1-gn and data lines d11-dm2 respectively. All thin film transistors in the same row (that is coupled to the same gate line) are turned on via scan signals on the gate lines g1-gn, thereby controlling whether data on the data line d11-dm2 is written to corresponding pixel electrode.

Moreover, FIG. 1 also shows peripheral driving circuits of the LCD panel 1. A gate driver 10 provides scan signals to the gate lines g1-gn according to a predetermined scan order. When one gate line carries a scan signal, the thin film transistors within in all display units in the same row or the gate line are turned on. When one gate line is selected, a data driver 20 provides data signals to the m display units in the selected gate line via the data lines d11-dm2 according to prepared but not yet displayed image data. Each time the gate driver 10 finishes scanning all n gate lines, the display of a single frame is complete. Therefore, the object of displaying images is achieved by repeatedly scanning scan lines and outputting video signals.

FIG. 2 shows circuit structure of the pixel electrode 40. As shown in FIG. 2, there is a pair of data lines respectively on two sides of the pixel electrode 40, such as data lines d21 and d22, and the pixel electrode 40 comprises a pair of sub-pixel electrodes 401 and 402. The sub-pixel electrode areas 401 and 402 respectively comprise switch devices q121 and q122 which are coupled to the gate line g1 and the corresponding data lines d21 and d22. In order to reduce coupling equivalent capacitance CP1 between the data line d21 and the sub-pixel electrode 401 and coupling equivalent capacitance CP2 between the data line d22 and the sub-pixel electrode 402, in conventional methods, the distance in a direction P1 (that is horizontal direction) between the data lines and the sub-pixel electrodes is increased. Generally, the distance in the direction P1 between the data line d21 and the sub-pixel electrode 401 and the distance in the direction P1 between the data line d22 and the sub-pixel electrode 402 have to be more than 7☐m (micro-meter), for the effect of the coupling equivalent capacitance to be effectively degraded. However, this also decreases the aperture ratio. The aperture ratio is a ratio of penetrable light which is calculated by dividing light-penetrable effective area by total area of the display unit. Thus, the decreased aperture ratio causes whole images to become dark.

Additionally, crosstalk is another factor which affects image quality of liquid crystal displays. For crosstalk, coupling capacitance effect from data lines and pixel electrodes causes image distortion of liquid crystal displays. Thus, it is desired to provide a liquid crystal display with high aperture ratio, wide visual angles, and decreased crosstalk.

SUMMARY OF THE INVENTION

In an exemplary embodiment, a liquid crystal display comprises a first pixel electrode, a second pixel electrode, a first data line, a second data line, a third data line, a fourth data line, and a first gate line. The first pixel electrode has a first primary sub-pixel electrode and a first secondary sub-pixel electrode which is separated from the first primary sub-pixel electrode. The second pixel electrode has a second primary sub-pixel electrode and a second secondary sub-pixel electrode which is separated from the second primary sub-pixel electrode. The first data line is coupled to the first secondary sub-pixel electrode and covered by the first pixel electrode. The second data line is coupled to the first primary sub-pixel electrode and covered by the second pixel electrode. The third data line is coupled to the second primary sub-pixel electrode and covered by the second pixel electrode. The fourth data line is coupled to the second secondary sub-pixel electrode. The first gate line is coupled to the first pixel electrode and the second pixel electrode.

In another exemplary embodiment, a liquid crystal display comprises a first pixel electrode, a second pixel electrode, a third pixel electrode, a first data line, a second data line, a third data line, a fourth data line, a fifth data line, a sixth data line, a gate line, a gate driver, a data driver, and an insulation layer. The first pixel electrode has a first primary sub-pixel electrode and a first secondary sub-pixel electrode which is separated from the first primary sub-pixel electrode. The second pixel electrode has a second primary sub-pixel electrode and a second secondary sub-pixel electrode which is separated from the second primary sub-pixel electrode. The third pixel electrode has a third primary sub-pixel electrode and a third secondary sub-pixel electrode which is separated from the third primary sub-pixel electrode. The first data line is coupled to the first secondary sub-pixel electrode and covered by the first pixel electrode. The second data line is coupled to the first primary sub-pixel electrode and covered by the second pixel electrode. The third data line is coupled to the second primary sub-pixel electrode and covered by the second pixel electrode. The fourth data line is coupled to the second secondary sub-pixel electrode and covered by the third pixel electrode. The fifth data line is coupled to the third secondary sub-pixel electrode and covered by the third pixel electrode. The sixth data line is coupled to the third primary sub-pixel electrode. The gate line is coupled to the first pixel electrode, the second pixel electrode, and the third pixel electrode. The gate driver provides a scan signal to the gate line. The data driver is coupled to the first data line, the second data line, the third data line, the fourth data line, the fifth data line, and the sixth data line. An insulation layer is disposed between the second data line and the second pixel electrode and between the third data line and the second pixel electrode. The insulation layer is formed by organic materials.

In an exemplary embodiment, a driving method for a liquid crystal display is provided. The liquid crystal display comprises a first data line, a second data line, a third data line, a fourth data line, a gate line, a first pixel electrode, and the second pixel electrode. Projections of the first and second data lines in a horizontal direction overlap projections of the first pixel electrode in the horizontal direction, and a projection of the fourth data line in the horizontal direction overlaps projections of the second pixel electrode in the horizontal direction. The first pixel electrode has a first primary sub-pixel electrode and a first secondary sub-pixel electrode, and the second pixel electrode has a second primary sub-pixel electrode and a second secondary sub-pixel electrode. The second pixel electrode is adjacent to the first pixel electrode. The driving method comprises providing a first data signal to the first data line, and providing a second data signal to the second data line, wherein polarities of the first data signal and the second data line are different according to a reference level.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
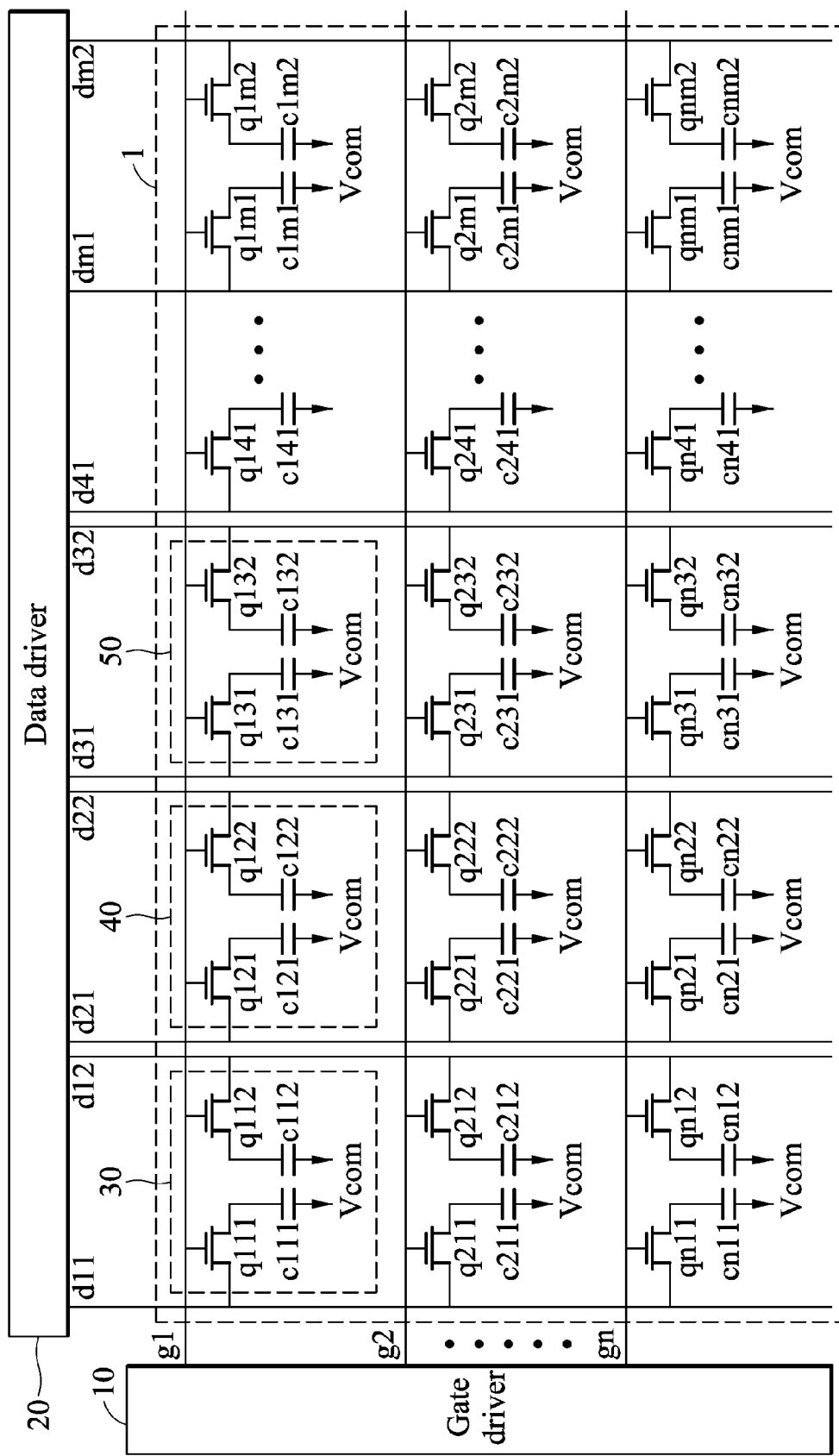
FIG. 1 is a schematic diagram of a conventional LCD panel and peripheral driving circuits.
Figure 2:
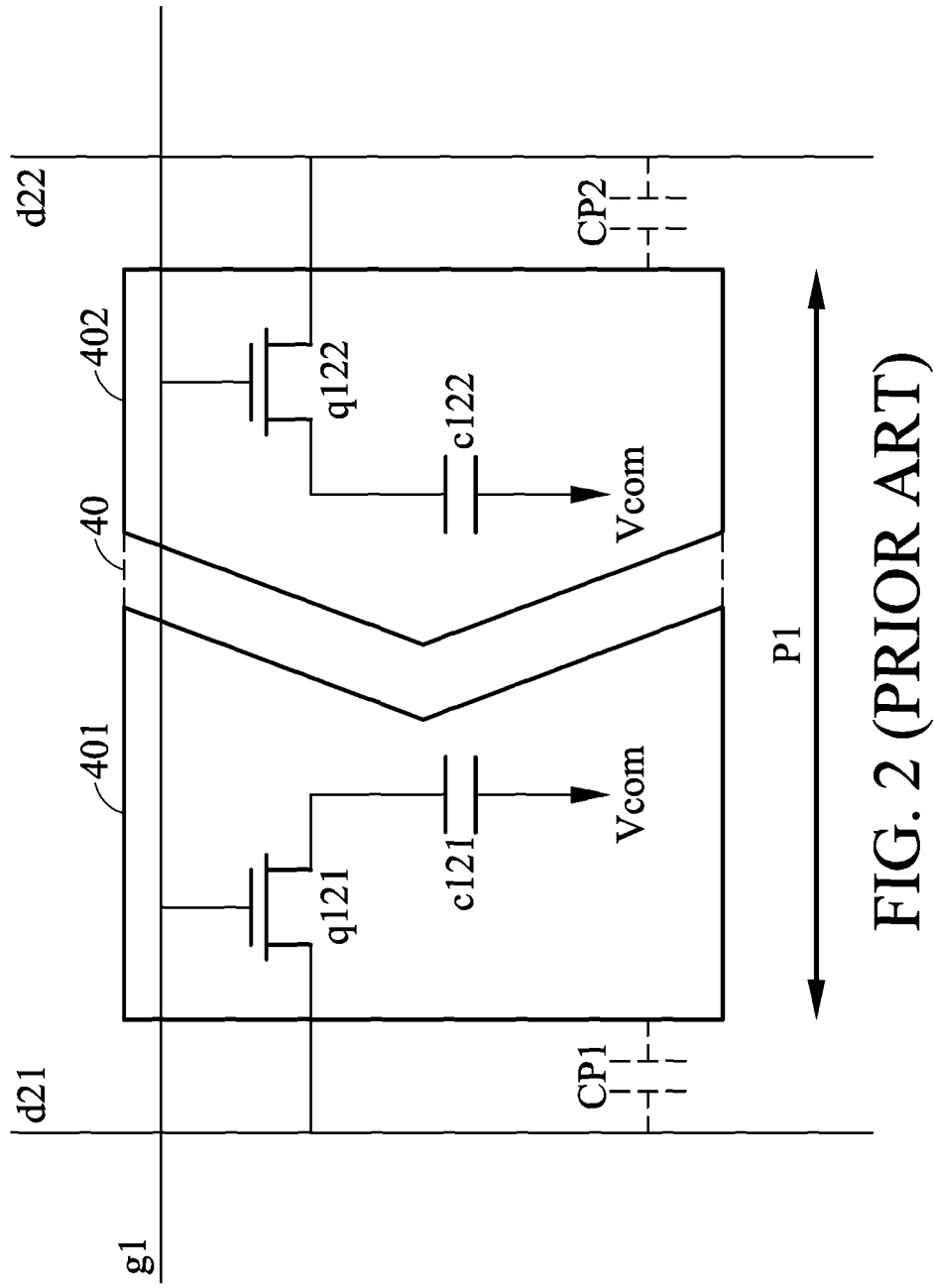
FIG. 2 shows circuit structure of a conventional pixel electrode.
Figure 3:
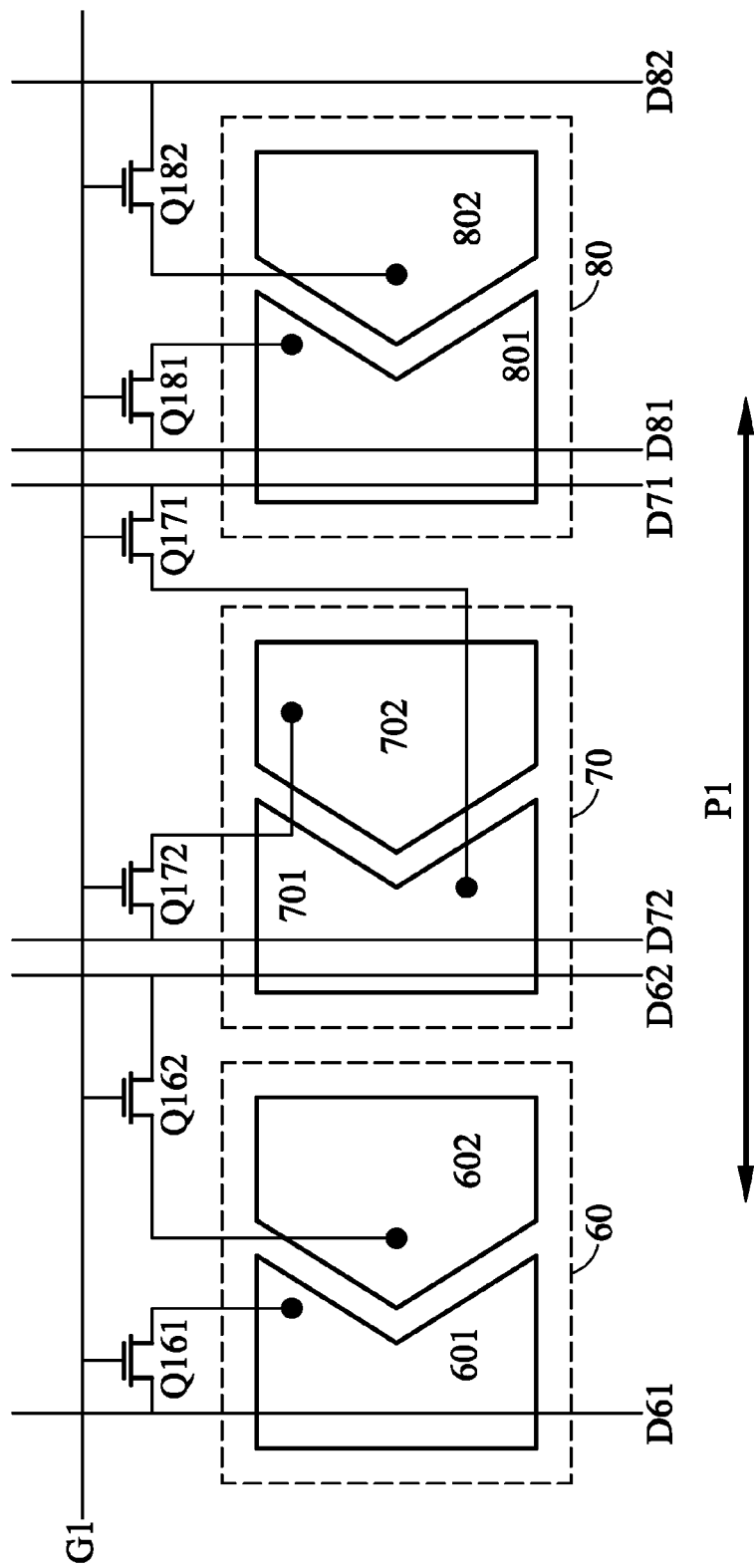
FIG. 3 shows an exemplary embodiment of a liquid crystal display.

FIG. 3 shows an exemplary embodiment of a liquid crystal display. For clear description, FIG. 3 shows only pixel electrodes 60, 70, and 80. The first pixel electrode 60 comprises a first primary sub-pixel electrode 602 and a first secondary sub-pixel electrode 601 which is separated from the first primary sub-pixel electrode 602. The second pixel electrode 70 is adjacent to the first pixel electrode 60 and comprises a second primary sub-pixel electrode 702 and a second secondary sub-pixel electrode 701 which is separated from the second primary sub-pixel electrode 702. Similarly, the third pixel electrode 80 comprises a third primary sub-pixel electrode 802 and a third secondary sub-pixel electrode 801 which is separated from the third primary sub-pixel electrode 802.

A gate line G1 is coupled to the first, second, and third pixel electrodes 60, 70, and 80. The second pixel electrode 70 is adjacent to the first and third pixel electrodes 60 and 80 and disposed between the first and third pixel electrodes 60 and 80.

As shown in FIG. 3, the first data line D61 is coupled to the first secondary sub-pixel electrode 601 and covered by the first pixel electrode 60. Herein, "one object is covered by another object" means that projections of the two objects in a horizontal direction overlap, for example, the projection of the first data line D61 in the horizontal direction overlaps the projection of the first pixel electrode 60 in the horizontal direction. The second data line D62 is coupled to the first primary sub-pixel electrode 602 and covered by the second pixel electrode 70. The third data line D72 is coupled to the second primary sub-pixel electrode 702 and covered by the second pixel electrode 70. The fourth data line D71 is coupled to the second secondary sub-pixel electrode 701 and covered by the third pixel electrode 80. The fifth data line D81 is coupled to the third secondary sub-pixel electrode 801 and covered by the third pixel electrode 80. The sixth data line D82 is coupled to the third primary sub-pixel electrode 802.

A first switch Q161 is coupled between the first secondary sub-pixel electrode 601, the first data line D61, and the gate line G1. A second switch Q162 is coupled between the first primary sub-pixel electrode 602, the second data line D62, and the gate line G1. A third switch Q172 is coupled between the second primary sub-pixel electrode 702, the third data line D72, and the gate line G1. A fourth switch Q171 is coupled between the second secondary sub-pixel electrode 701, the fourth data line D71, and the gate line G1. A fifth switch Q181 is coupled between the third secondary sub-pixel electrode 801, the fifth data line D81, and the gate line G1. A sixth switch Q182 is coupled between the third primary sub-pixel electrode 802, the sixth data line D82, and the gate line G1. In the embodiment, the first, second, third, fourth, fifth, and sixth switches Q161, Q162, Q172, Q171, Q181, and Q182 can be implemented by thin film transistors.

For the second pixel electrode 70, the corresponding data lines are lines D72 and D71. In order to decrease the distance between the data lines and the sub-pixel electrodes, the data line D72 is disposed under the second pixel electrode 70 and covered by the second pixel electrode 70, and the data line D71 is disposed under the third pixel electrode 80 and covered by the third pixel electrode 80. This design avoids distance increase between the data lines and the sub-pixel electrodes, so that aperture ratio is enhanced.

Figure 4:
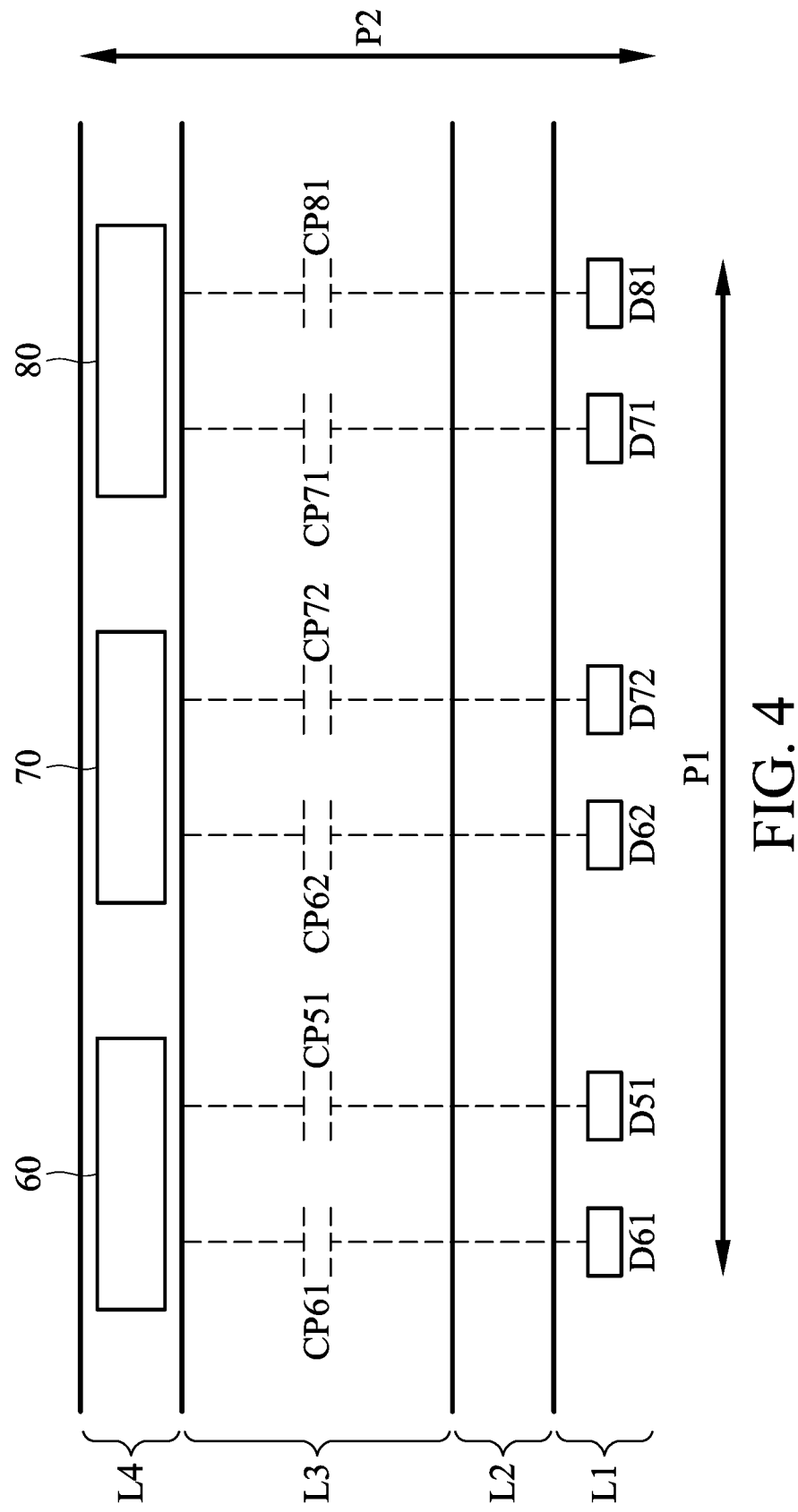
FIG. 4 shows an exemplary embodiment of pixel electrodes and peripheral circuitry.

Moreover, as shown in FIG. 4, "L1" represents a metal layer of the data lines, "L2" represents a dielectric layer, "L3" represents an insulation layer with organic materials, and "L4" represents a transparent electrode layer ITO (Indium Tin Oxide, ITO). The data lines D62 and D72 are covered by the second pixel electrode 70, meaning that when the data lines D62 and D72 is disposed under the second pixel electrode 70, the distance between the data lines D62 an D72 in the direction P1 (horizontal direction) is less than the width of the second pixel electrode 70. For the second pixel electrode 70, the coupling equivalent capacitance CP62 and CP72 is generated in the direction P2 (vertical direction). In order to reduce vertical crosstalk resulted from the coupling equivalent capacitance, in this embodiment, an insulation layer L3 is additionally disposed between the metal layer L1 and the transparent electrode layer (ITO) L4 other than the dielectric layer L2, so that the distance between the pixel electrode and the corresponding data lines is increased in the direction P2 (vertical direction). The insulation layer L3 is formed by organic materials, and thickness of the insulation layer L3 is adjusted to 2-3□m or more than 3□m.

Figure 5:
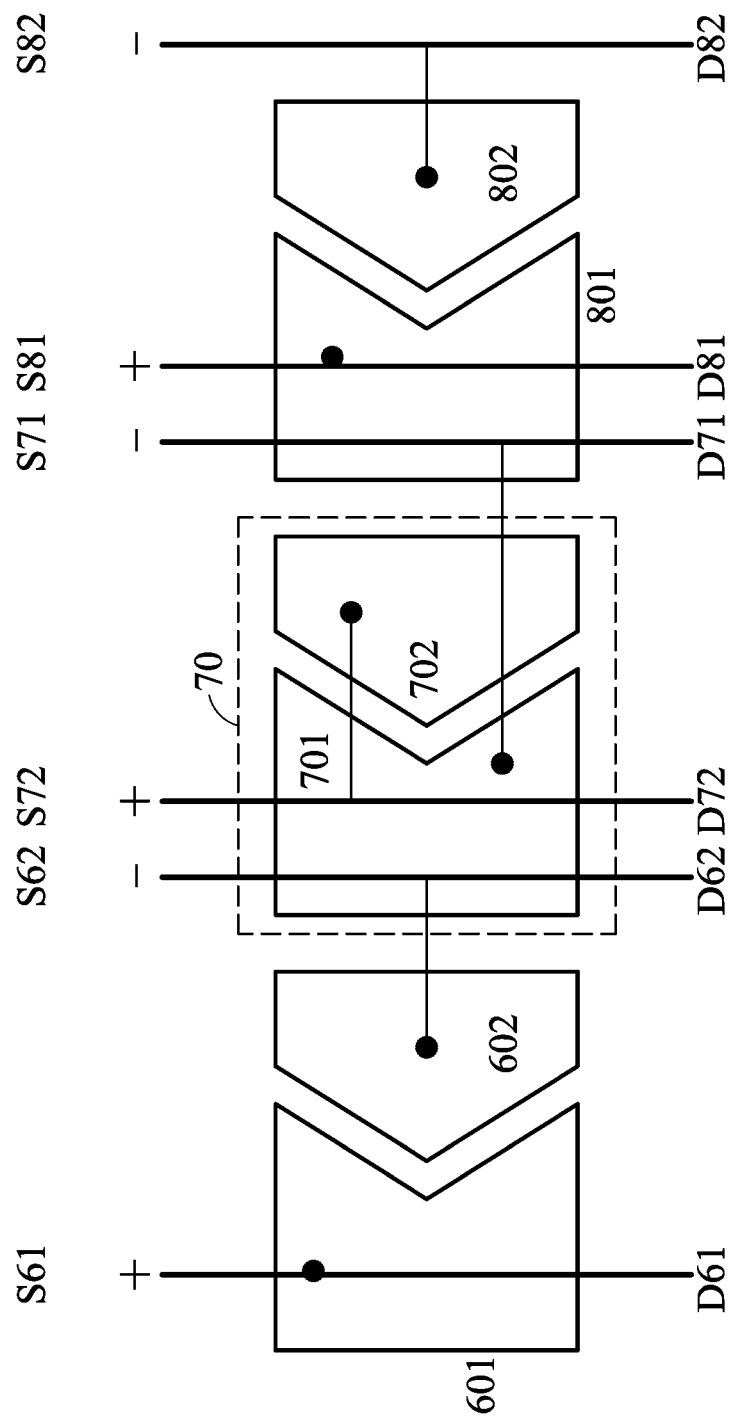
FIG. 5 shows an exemplary embodiment of pixel electrodes and peripheral circuitry.

According to the embodiments, polarity change of the data signals can be controlled to reduce vertical crosstalk resulted from the coupling equivalent capacitance in the vertical direction. As shown in FIG. 5, the first data line D61 provides a first data signal S61 with a positive polarity (represented by "+") to the first secondary sub-pixel electrode 601, while the second data line D62 provides a second data signal S62 with a negative polarity (represented by "−") to the first primary sub-pixel electrode 602. Herein, the polarities of the first data signal S61 and the second data signal S62 are determined according to the data voltage levels comparable to a reference level (Vcom) to be the positive (+) and the negative (−). For example, when the voltage level of the data signal is greater than the reference level (Vcom), the data signal has a positive polarity (+), on the contrary, when the voltage level of the data signal is less than the reference level (Vcom), the data signal has a negative polarity (−). The third data line D72 provides a third data signal S72 with the positive polarity (+) to the second primary sub-pixel electrode 702, while the fourth data line D71 provides a fourth data signal S71 with the negative polarity (−) to the second secondary sub-pixel electrode 701. For the second pixel electrode 70, the data lines D62 and D72 are disposed thereunder. The data line D62 couples a voltage level of the negative polarity (−) to the second pixel electrode 70, while the data line D72 couples a voltage level of the positive polarity (+) to the second pixel electrode 70. Accordingly, the coupling voltage subject to the second pixel electrode 70 is neutralized by the positive polarity (+) and negative polarity (−) data signals, so that vertical crosstalk in images is eliminated.

As above described, multi-domain vertical alignment (MVA) has been provided in the art. When images are displayed by low gray levels, color shifting can easily occur. Thus, each pixel electrode is divided into two sub-pixel electrodes, and two data signals with different voltage levels are respectively provided to the sub-pixel electrodes via data lines, so that color shifting is eliminated. In other cases, when images are displayed by high gray levels, color shifting only slightly occurs. Thus, two data signals with different or the same voltage levels are respectively provided to the sub-pixel electrodes according to requirements.

Figure 6A:
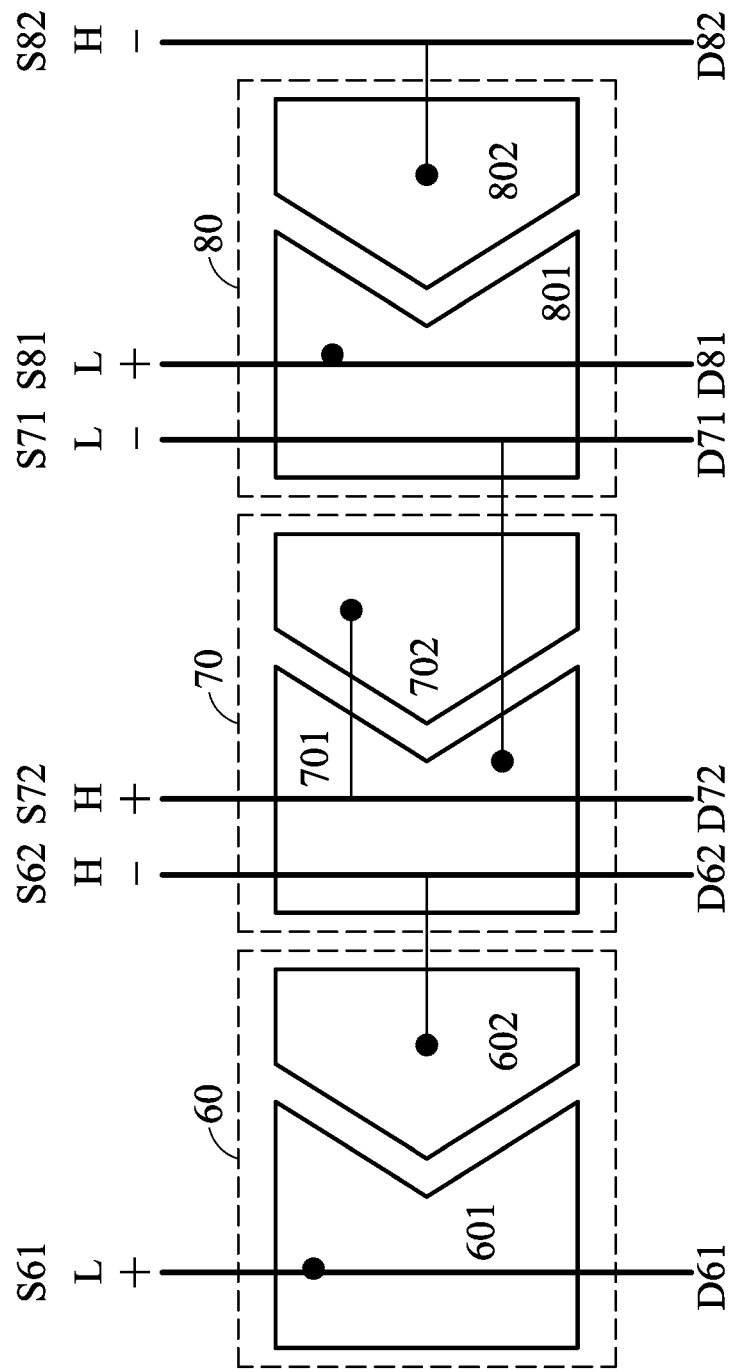
FIG. 6A shows an exemplary embodiment of pixel electrodes and peripheral circuitry.

In the embodiments, the voltage level change of the data signals can be controlled to reduce vertical crosstalk resulting from the coupling equivalent capacitance in the vertical direction. As shown in FIG. 6A, a gray level displayed by the first pixel electrode 60 is lower than a predetermined gray level. Note that herein, the predetermined gray level is a threshold gray level for determination whether color shifting has occurred. For example, when the displayed gray level is lower than the 128th level, color shifting has easily occurred, while when the displayed gray level is higher than the 128th level, color shifting has only slightly occurred. Thus, the 128th level is determined as the predetermined gray level. The difference between the first data signal S61 and the reference level (Vcom) is not greater than the difference between the second data signal S62 and the reference level (Vcom). That is, the data signal S61 with a low voltage level (represented by "L") is provided to the first secondary sub-pixel electrode 601, and the data signal S62 with a high voltage level (represented by "H") is provided to the first primary sub-pixel electrode 602. Accordingly, for the first pixel electrode 60, the data line D61 provides the data signal S61 with the low voltage level (L) to the first secondary sub-pixel electrode 601, while the data line D62 provides the data signal S62 with the high voltage level (H) to the first primary sub-pixel electrode 602. Thus, for the first pixel electrode 60, the resulting color shifting due to a low gray can be eliminated. As the reason described above, two data signals with different voltage levels are provided to the same pixel electrode to eliminate color shifting.

When gray level displayed by the second pixel electrode 70 is lower than the predetermined gray level, the difference between the fourth data signal S71 and the reference level (Vcom) is not greater than the difference between the third data signal S72 and the reference level (Vcom). That is, the data signal S71 with the low voltage level (L) is provided to the second secondary sub-pixel electrode 701, and the data signal S72 with the high voltage level (H) is provided to the second primary sub-pixel electrode 702. Accordingly, for the second pixel electrode 70, the data line D62 under the second pixel electrode 70 couples the data signal S62 with the high voltage level (H) and the negative polarity (−) to the second pixel electrode 70, while the data line D72 couples the data signal S72 with the high voltage level (H) and the positive polarity (+) to the second pixel electrode 70. Thus, the high-level coupling voltage subject to the second pixel electrode 70 is neutralized by the positive polarity (+) and negative polarity (−) data signals, so that vertical crosstalk in images is eliminated When gray level displayed by the third pixel electrode 80 is lower than the predetermined gray level, the difference between the fifth data signal S81 and the reference level (Vcom) is not greater than the difference between the sixth data signal S82 and the reference level (Vcom). That is, the data signal S81 with a low voltage level (L) is provided to the third secondary sub-pixel electrode 801, and the data signal S82 with a high voltage level (H) is provided to the third primary sub-pixel electrode 802. Accordingly, for the third pixel electrode 80, the data line D71 under the third pixel electrode 80 couples the data signal S71 with the low voltage level (L) and the negative polarity (−) to the third pixel electrode 80, while the data line D81 couples the data signal S81 with the low voltage level (L) and the positive polarity (+) to the third pixel electrode 80. Thus, the low-level coupling voltage subject to the third pixel electrode 80 is neutralized by the positive polarity (+) and negative polarity (−) data signals, so that vertical crosstalk in images is eliminated.

Figure 6B:
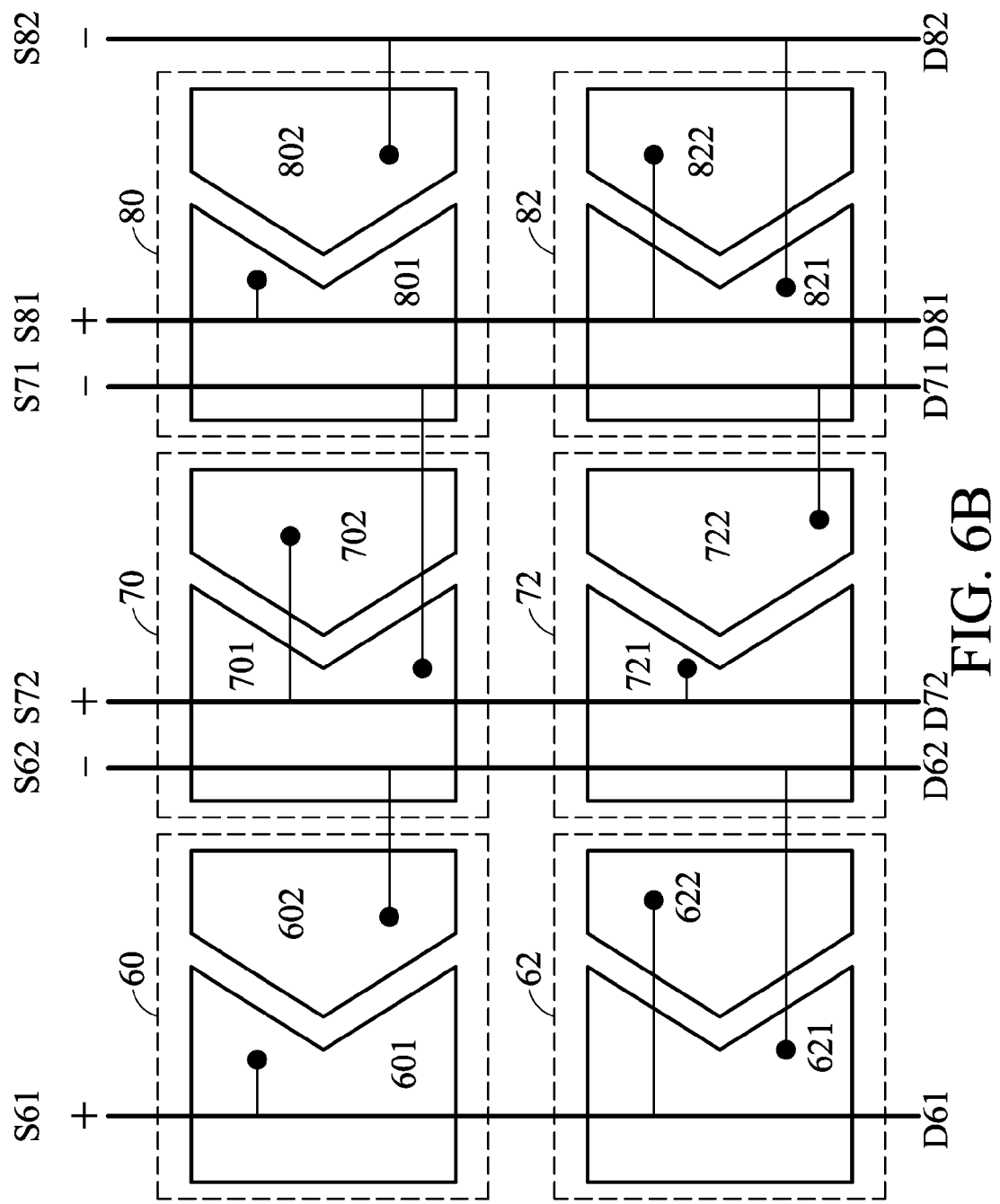
FIG. 6B shows an exemplary embodiment of pixel electrodes and peripheral circuitry.

According to the embodiments, the connection between the data lines and the pixel electrodes can be adjusted to enhance operation effect of the data driver, so that the data driver can output the signals in line inversion to obtain high quality images as in dot inversion. As shown in FIG. 6B, the first gate line (or the odd gate lines) is coupled to the pixel electrodes 60, 70, and 80, and the second gate line (or the even gate lines) is coupled to the pixel electrodes 62, 72, and 82. The first data line D61 is coupled to the first secondary sub-pixel electrode 601 and the fourth primary sub-pixel electrode 622. The second data line D62 is coupled to the first primary sub-pixel electrode 602 and the fourth secondary sub-pixel electrode 621. Accordingly, when the data driver outputs the signals in line inversion, in the same frame, the first data line D61 remains at the positive polarity (+), and the second data line D62 remains at the negative polarity (−). That is, the first secondary sub-pixel electrode 601 coupled to the first gate line and the fourth primary sub-pixel electrode 622 coupled to the second gate line are both at the positive polarity (+), while the first primary sub-pixel electrode 602 coupled to the first gate line and the fourth secondary sub-pixel electrode 621 coupled to the second gate line are both at the negative polarity (−). The quality images in dot inversion can be obtained.

Figure 7:
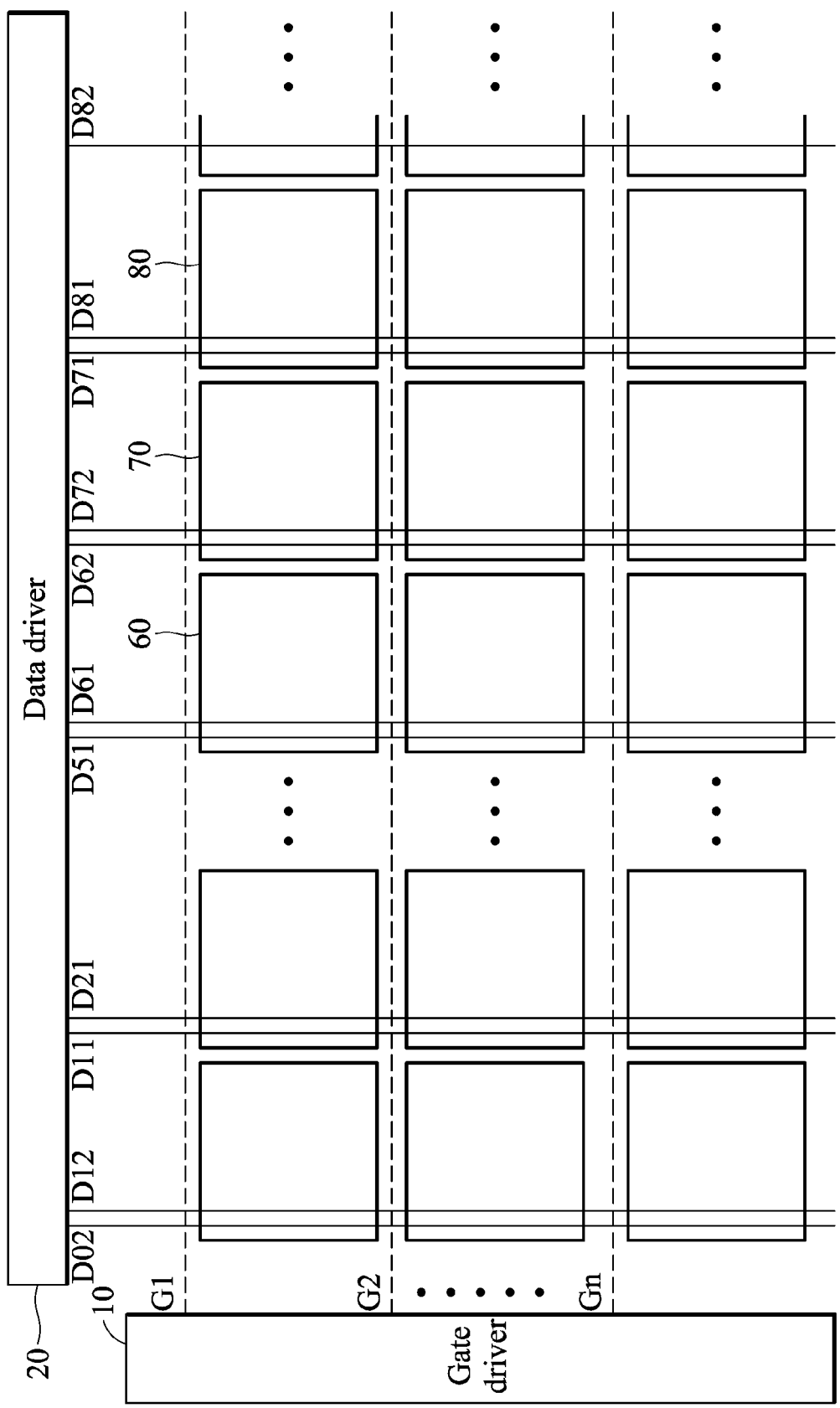
FIG. 7 shows an exemplary embodiment of an LCD panel and peripheral driving circuits.

FIG. 7 shows an exemplary embodiment of an LCD panel and peripheral driving circuits. As shown in FIG. 7, a gate driver 10 and a data driver 20 are further provided. The gate driver 10 provides scan signals to the gate lines G1, G2, . . . Gn according to a predetermined scan order. The data driver 20 provides to data signals to the m display units in the selected gate line via the data lines D02, D11, D12, . . . Dm2 according to displayed image data. Each interlaced set including two data lines and a gate line corresponds to one display unit and is used to control one pixel electrode. For example, the data lines D61 and D62 and the gate line G1 control the pixel electrode 60, the data lines D71 and D72 and the gate line G1 control the pixel electrode 70, and the data line D81 and D82 and the gate line G1 control the pixel electrode 80. To enhance aperture ratio, the pixel electrodes 60, 70, and 80 are extended toward left to cover the data lines D61, D51, D62, D72, D71, and D81, respectively.

When the LCD panel displays images by low gray levels, for the pixel electrodes 60, 70, and 80, different polarities are provided to the data lines D61, D51, D62, D72, D71, and D81 as described above. Thus, the negative issues concerning visual angle, color shifting, and vertical crosstalk are eliminated.

Figure 8:
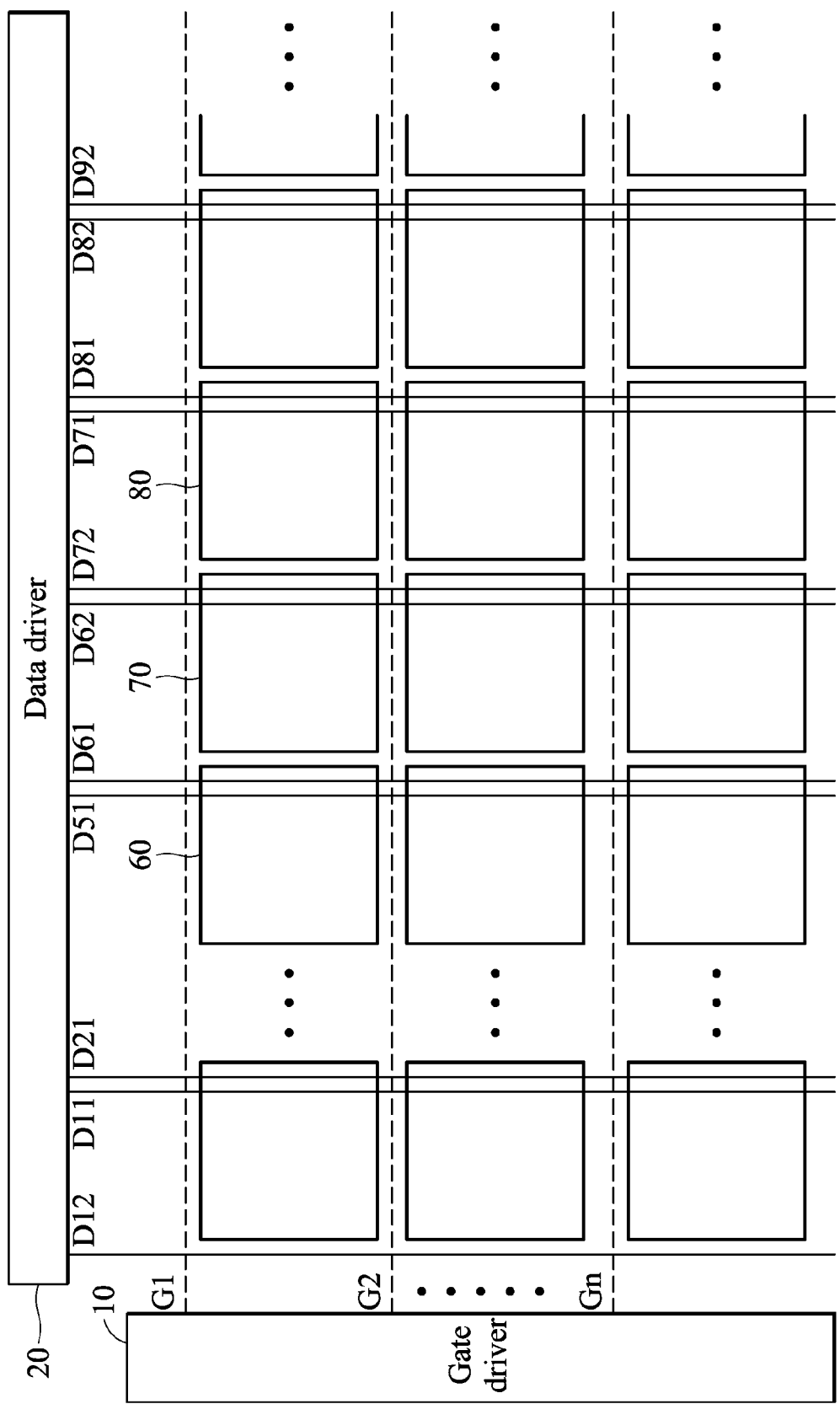
FIG. 8 shows another exemplary embodiment of an LCD panel and peripheral driving circuits.

FIG. 8 shows another exemplary embodiment of an LCD panel and peripheral driving circuits. The structures in FIGS. 7 and 8 are similar, except that the pixel electrodes 60, 70, and 80 are extended towards the right to cover the data lines D61, D51, D62, D72, D71, and D81. The aperture ratio of each display unit is also enhanced.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal display, comprising
   a first pixel electrode having a first primary sub-pixel electrode and a first secondary sub-pixel electrode which is separated from the first primary sub-pixel electrode;
   a second pixel electrode having a second primary sub-pixel electrode and a second secondary sub-pixel electrode which is separated from the second primary sub-pixel electrode;
   a first data line coupled to the first secondary sub-pixel electrode and covered by the first pixel electrode;
   a second data line coupled to the first primary sub-pixel electrode and covered by the second pixel electrode;
   a third data line coupled to the second primary sub-pixel electrode and covered by the second pixel electrode;
   a fourth data line coupled to the second secondary sub-pixel electrode; and
   a first gate line coupled to the first pixel electrode and the second pixel electrode,
   wherein the first data line provides a first data signal to the first secondary sub-pixel electrode, the second data line provides a second data signal to the first primary sub-pixel electrode, and the first data signal and the second data signal have different polarities according to a reference level, and
   wherein the third data line provides a third data signal to the second primary sub-pixel electrode, the fourth data line provides a fourth data signal to the second secondary sub-pixel electrode, the third data signal and the fourth data signal have different polarities according to the reference level, and the third data signal and the second data signal have different polarities according to the reference level.

2. The liquid crystal display as claimed in claim 1 further comprising:
   a first switch coupled between the first secondary sub-pixel electrode, the first data line, and the first gate line;
   a second switch coupled between the first primary sub-pixel electrode, the second data line, and the first gate line;
   a third switch coupled between the second primary sub-pixel electrode, the third data line, and the first gate line; and
   a fourth switch coupled between the second secondary sub-pixel electrode, the fourth data line, and the first gate line.

3. The liquid crystal display as claimed in claim 2, wherein the first, second, third, and fourth switches are thin film transistors.

4. The liquid crystal display as claimed in claim 1, wherein the first pixel electrode is adjacent to the second pixel electrode.

5. The liquid crystal display as claimed in claim 1 further comprising:
   a third pixel electrode having a third primary sub-pixel electrode and a third secondary sub-pixel electrode which is separated from the third primary sub-pixel electrode and covering the fourth data line;
   a fifth data line coupled to the third secondary sub-pixel electrode and covered by the third pixel electrode; and
   a sixth data line coupled to the third primary sub-pixel electrode.

6. The liquid crystal display as claimed in claim 5 further comprising:
   a fifth switch coupled between the third secondary sub-pixel electrode, the fifth data line, and the first gate line, and
   a sixth switch coupled between the third primary sub-pixel electrode, the sixth data line, and the first gate line.

7. The liquid crystal display as claimed in claim 5, wherein the second pixel electrode is adjacent to the first pixel electrode and the third pixel electrode and disposed between the first pixel electrode and the third pixel electrode.

8. The liquid crystal display as claimed in claim 1, wherein when a gray level displayed by the first pixel electrode is lower than a predetermined gray level, the difference between the first data signal and the reference level is not greater than the difference between the second data signal and the reference level.

9. The liquid crystal display as claimed in claim 1, wherein when a gray level displayed by the second pixel electrode is lower than a predetermined gray level, the difference between the fourth data signal and the reference level is not greater than the difference between the third data signal and the reference level.

10. The liquid crystal display as claimed in claim 1 further comprising an insulation layer disposed between the second data line and the second pixel electrode and between the third data line and the second pixel electrode, wherein the insulation layer is formed by organic materials.

11. The liquid crystal display as claimed in claim 1 further comprising an insulation layer disposed between the second data line and the second pixel electrode and between the third data line and the second pixel electrode, wherein thickness of the insulation layer is between 2 μm and 3 μm.

12. The liquid crystal display as claimed in claim 1 further comprising:
   a fourth pixel electrode having a fourth primary sub-pixel electrode and a fourth secondary sub-pixel electrode which is separated from the fourth primary sub-pixel electrode;
   a fifth pixel electrode having a fifth primary sub-pixel electrode and a fifth secondary sub-pixel electrode which is separated from the fifth primary sub-pixel electrode; and
   a second gate line coupled to the fifth pixel electrode and the fourth pixel electrode;
   wherein the first data line is coupled to the first secondary sub-pixel electrode and the fourth primary sub-pixel electrode and covered by the first pixel electrode and the fourth pixel electrode;
   wherein the second data line is coupled to the first primary sub-pixel electrode and the fourth secondary sub-pixel electrode and covered by the second pixel electrode and the fifth pixel electrode;
   wherein a third data line is coupled to the second primary sub-pixel electrode and the fifth secondary sub-pixel electrode and covered by the second pixel electrode and the fifth pixel electrode; and
   wherein the fourth data line is coupled to the second secondary sub-pixel electrode and the fifth primary sub-pixel electrode.

13. A liquid crystal display, comprising
   a first pixel electrode having a first primary sub-pixel electrode and a first secondary sub-pixel electrode which is separated from the first primary sub-pixel electrode;
   a second pixel electrode having a second primary sub-pixel electrode and a second secondary sub-pixel electrode which is separated from the second primary sub-pixel electrode;
   a third pixel electrode having a third primary sub-pixel electrode and a third secondary sub-pixel electrode which is separated from the third primary sub-pixel electrode;
   a first data line coupled to the first secondary sub-pixel electrode and covered by the first pixel electrode;
   a second data line coupled to the first primary sub-pixel electrode and covered by the second pixel electrode;
   a third data line coupled to the second primary sub-pixel electrode and covered by the second pixel electrode;
   a fourth data line coupled to the second secondary sub-pixel electrode and covered by the third pixel electrode;
   a fifth data line coupled to the third secondary sub-pixel electrode and covered by the third pixel electrode;
   a sixth data line coupled to the third primary sub-pixel electrode;
   a gate line coupled to the first pixel electrode, the second pixel electrode, and the third pixel electrode;
   a gate driver providing a scan signal to the gate line;
   a data driver coupled to the first data line, the second data line, the third data line the fourth data line, the fifth data line, and the sixth data line; and
   an insulation layer disposed between the second data line and the second pixel electrode and between the third data line and the second pixel electrode, wherein the insulation layer is formed by organic materials,
   wherein the first data line provides a first data signal to the first secondary sub-pixel electrode, the second data line provides a second data signal to the first primary sub-pixel electrode, and the first data signal and the second data signal have different polarities according to a reference level, and
   wherein the third data line provides a third data signal to the second primary sub-pixel electrode, the fourth data line provides a fourth data signal to the second secondary sub-pixel electrode, the third data signal and the fourth data signal have different polarities according to the reference level, and the third data signal and the second data signal have different polarities according to the reference level.

14. A driving method for a liquid crystal display, wherein the liquid crystal display comprises a first data line, a second data line, a third data line, a fourth data line, a gate line, a first pixel electrode, and a second pixel electrode, projections of the first and second data lines in a horizontal direction overlap projections of the first pixel electrode in the horizontal direction, a projection of the fourth data line in the horizontal direction overlaps projections of the second pixel electrode in the horizontal direction, the first pixel electrode has a first primary sub-pixel electrode and a first secondary sub-pixel electrode, the second pixel electrode has a second primary sub-pixel electrode and a second secondary sub-pixel electrode, and the second pixel electrode is adjacent to the first pixel electrode, comprising:
   providing a first data signal to the first data line;
   providing a second data signal to the second data line, wherein polarities of the first data signal and the second data line are different according to a reference level; and
   providing a third data signal to the third data line, wherein when a gray level displayed by the first pixel electrode is lower than a predetermined gray level, the difference between the third data signal and the reference level is not greater than the difference between the second data signal and the reference level.

15. The driving method as claimed in claim 14 further comprising providing a fourth data signal to the fourth data line, wherein when a gray level displayed by the second pixel electrode is lower than a predetermined gray level, wherein the difference between the fourth data signal and the reference level is not greater than the difference between the first data signal and the reference level.

* * * * *